Aug. 2, 1966
J. A. SCHWARTZ
3,263,808
METHOD FOR THE SEPARATION OF PARTICLES OF
DIFFERENT SIZES AND DENSITIES
Filed June 11, 1962
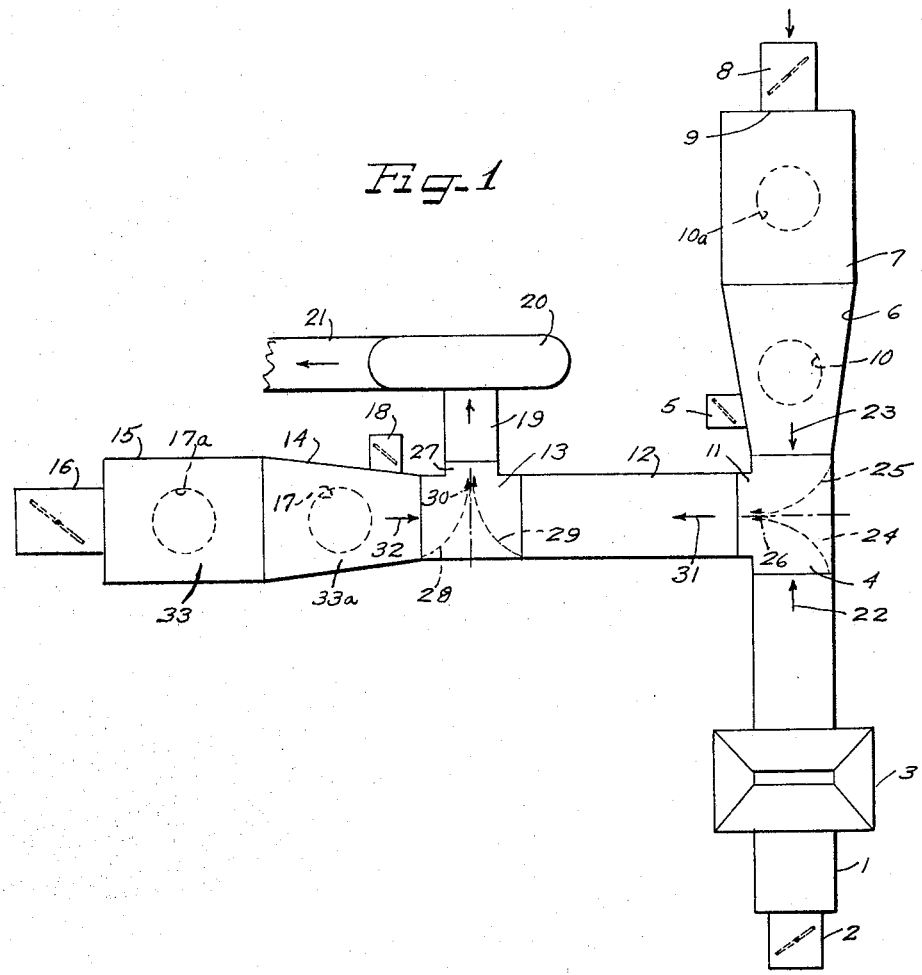
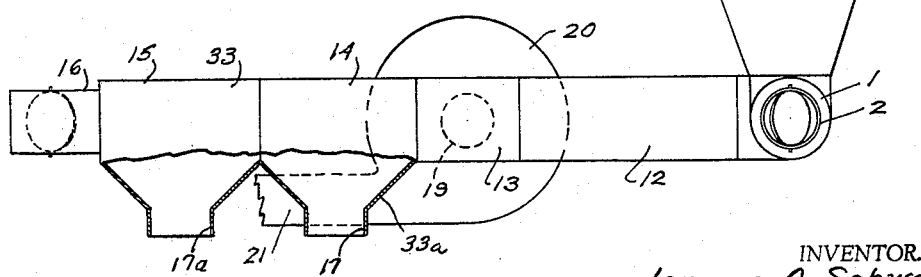
INVENTOR.
Jerome A. Schwartz
BY
ATTORNEYS United States Patent Office 3,263,808
Patented August 2, 1966

3,263,808
METHOD FOR THE SEPARATION OF PARTICLES OF DIFFERENT SIZES AND DENSITIES
Jerome A. Schwartz, 3520 Lake Shore Drive, Chicago, Ill.
Filed June 11, 1962, Ser. No. 201,715
4 Claims. (Cl. 209—30)

This invention relates to a method for the separation of a pulverulent mixture of different solid substances into fractions, one or more of which is upgraded as to a desired constituent. More particularly, the invention relates to a gaseous system in which the pulverulent mixture to be classified or upgraded is initially suspended in a first stream of gas confined to unidirectional flow and a separation of such suspended mixture into fractions is effected by setting up gas pressure faces, or planes of resistance, through which one fraction of the mixture will pass while another fraction still in suspension is drawn off in a direction that lies substantially in the plane of such pressure face.

Somewhat similar systems have have been proposed in the past but they have not embodied the critical principles of my present invention. For instance, in the Van Doorn Patent No. 2,681,476, a process and apparatus are described for separating trash from lint cotton, wherein a main gaseous stream of the heavier trash particles is caused to overshoot an opening through which a diversionary stream of air, or gas, is caused to flow upwardly, transversely of the main stream, to divert from the latter stream the lighter particles of line. In Van Doorn, no gaseous face, or plane, of resistance is set up, as in the system of my invention.

In my system a primary gas fan or blower serves to set up two confined gas streams having a common axial extent but flowing in opposite directions. Where the oppositely flowing streams meet, a plane or face of resistance is formed by drawing off a confined confluent portion of said two streams in a direction forming an extension of said plane. By a proper dimensioning of the confining gas flow conduits, a proper selection of blower capacity and a proper adjustment of valves or the like, the system can be so operated as to maintain pressure drops across the planes of resistance and other conditions necessary for an effective separation of the initial mixture of pulverulent solids into fractions that are of greater value because of closer classification or because of upgrading of a desired constituent, and such fractions can be separately collected. One or more faces of resistance may be set up in the system depending upon the requirements which the system is designed to meet.

It is therefore an important object of this invention to provide an improved gaseous system for the separation of a pulverulent mixture of solids into fractions that, due to particle size classification or to the upgrading of the content therein of an initial constitutent of the mixture, are economically desirable.

It is a further important object of this invention to provide a method in which a mixture of pulverulent solids is first suspended in a gaseous stream, and gaseous pressure faces, or planes of resistance, are set up at one or more points along the flow of such stream at its confluence with other streams and the pressure gradient between opposite sides of such pressure faces is so controlled as to enable an effective separation of said mixture into fractions of enhanced economic usefulness.

Other and further important objects of this invention will become more apparent from the following description, particularly when taken in connection with the accompanying drawings.

In the drawings, wherein like numerals are employed to designate the same structural elements:

FIGURE 1 is a diagrammatic plan view exemplifying apparatus which may be employed to practice the method of my invention, and FIGURE 2 is an end elevational view of the same apparatus.

As shown in the drawings, suitable apparatus for practicing the method of my invention comprises a feed conduit 1, the axis of which preferably lies in the horizontal plane. Said conduit 1 is provided at its free end with an intake valve 2 for the controlled admission of air or other gas suitable for forming a suspension of a pulverulent solid mixture that is to be separated into fractions. Such a pulverulent solid mixture is introduced into the conduit 1 by means of a feed hopper 3 and a suitable valve (not shown) for metering the feed at a proper rate that will, in correlation with the rate of flow of the gas through the conduit 1, insure the entrainment of the solids in the gas flow.

The straight run of the conduit 1 is connected beyond the feed hopper 3 into the straight portion, or head, of a T-connector 4, into the opposite end of which is connected a conduit section 6 having a common axis with the conduit 1. Said conduit section 6 may be flared for connection at its further end with a larger diameter conduit section 7, also coaxial with the conduit 1. A gas-intake valve, or damper, 8, controls the admission of air or gas into the otherwise open end 9 of the conduit section 7. Preferably, the conduit 6 is also provided with a gas-intake valve, or damper, 5, that may be used to supplement gas taken in through the intake valve 8. Said sections 6 and 7 are provided with one or more openings 10 and 10a in their lower surfaces for the gravity collection in a collector (not shown) of the primary fraction of the initial mixture that is carried axially beyond the T-fitting 4, as will be more fully explained hereinafter.

Said T-fitting 4 is provided with a stem in the form of an annular connecting portion 11, the axis of which is substantially at right angles to the common axis of the conduit 1, the head of the T 4 and the conduit sections 6 and 7. Said flange 11 is connected to one end of a straight length of conduit 12, the other end of which is connected to a second T-fitting 13. The opposite end of the head of the T-fitting 13 is connected to straight conduit sections 14 and 15 that have a common axis with the length of conduit 12. Said conduit section 15 is provided at its otherwise open free end with a main gas-intake valve 16 and said section 14 with a supplementary gas-intake valve 18. Openings 17 and 17a from hoppers 33 and 33a are provided for gravity collection in a secondary collector (not shown) of that fraction of the gas-borne pulverulent mixture that is carried beyond the T-fitting 13 into the conduit sections 14 and 15.

Said T-fitting 13 is formed with an annular flange 27 that constitutes the stem of the T and that serves for connection to a conduit section 19, the axis of which is substantially at right angles to the axis of the conduit sections 12, 14 and 15. The conduit 19 is connected to the intake of gas or air blower 20, from which the gas is discharged through a conduit 21 leading to any standard type of dust separator, such as a cyclone separator (not shown).

In the operation of a system such as illustrated in the drawing, the gas blower 20 forms the primary, and usually the only, means for creating gas flow through the system. With the blower 20 in operation, the valves 2, 5, 8, 16 and 18 are adjusted to give the desired volume rates of flow and pressure gradients across the faces, or planes, of resistance that are set up within the T-sections 4 and 13, as will presently be described. The feed of the pulverulent solid mixture through the feed hopper 3 into the conduit 1 is such as to insure entrainment of the mixture in the first, or main, stream of air, or other gas, flowing unidirectionally, as indicated by the arrow 22, into the T-fitting 4.

Due to the suction effect of the blower 20, air will also be drawn in through the valves 5 and 8 into the conduit sections 6 and 7 in a direction, as indicated by the arrow 23, that is toward the T-fitting 4 and therefore is directly opposed to the main flow into said fitting 4 from the conduit 1. At the confluence of the first and second gaseous streams there will be formed a face of resistance indicated by the dotted lines 24 and 25 which merge into a common plane 26 at right angles to the axis of said conduits 1, 6 and 7. The axis of the conduit 12 lies in, or substantially in, the extension of the plane 26.

As will later be explained in connection with the specific example, a first fraction of the pulverulent solid mixture that is suspended in the first gas stream flowing through the conduit 1 is that which passes beyond the plane of resistance 26 into the conduits sections 6 and 7, and it is this main fraction that is collected through the openings 10 and 10a into a primary collector.

A second pressure face is set up within the T 13, as indicated by the dotted lines 28 and 29 and their merger into a plane of resistance 30. Such plane of resistance 30 is formed in the same manner as that described in connection with the formation of the plane of resistance 26, namely, by the confluence of the two streams of gas flowing through the conduit sections 12 and 14–15 in opposite directions, as shown by the arrows 31 and 32, respectively. The fraction of the pulverulent solid mixture that passes through said plane of resistance 30 into the conduit sections 14–15 drops through the lower openings 17 and 17a into a secondary collector.

The residual portion of the pulverulent solid mixture that remains after separation of the primary fraction at the plane of resistance 26 and of the secondary fraction at the plane of resistance 30, is drawn off through the conduit 19 into the intake of the blower 20 and discharged therefrom through the exhaust duct 21 into a suitable dust separator and collector (not shown).

The following example will serve to illustrate the application of the method of my invention to the upgrading of iron ore, but it should be understood that this example is merely by way of exemplification and is not intended to limit the scope of my invention in any way.

EXAMPLE I

The starting material was an iron ore assaying 31.24% Fe, and previously crushed to a particle size such that substantially all of the particles would pass through a 48 mesh screen. Where mesh units are given herein, they will be understood to refer to the Tyler Standard Screen Scale Series and to mean the number of meshes per linear inch. A minus (−) sign means that the powder will pass through the specified mesh, while a plus (+) sign means that the powder will stay on the specified mesh screen.

On the basis of 100 lbs. of ore as the starting material, the following screen analysis will serve to indicate the weight distribution, iron assay, weight units of iron (Fe) and percentage of Fe units of the total, in accordance with the following table:

| Fractions Screen Mesh | Weight # | Iron (Fe) Assay | Units Fe | Ptg. of Total Fe Units in Fractions |
|---|---|---|---|---|
| −48 +65 | 10 | 23.05 | 2.305 | 7.4 |
| −65 +100 | 13.33 | 23.30 | 3.09 | 9.8 |
| −100 +150 | 10 | 25.85 | 2.58 | 8.2 |
| −150 +200 | 20 | 30.80 | 6.16 | 19.7 |
| −200 +325 | 20 | 35.90 | 7.18 | 22.9 |
| −325 | 26.66 | 37.35 | 9.93 | 31.8 |
| | 99.9 | | 31.24 | 99.8 |

The iron ore starting material was fed into the feed conduit 1 through the feed hopper 3 at a rate of 5 lbs. per minute. With the blower 20 in operation and the valves 2, 5, 8, 16 and 18 properly adjusted, a stream of air was drawn through the valve 2 into conduit 1 at a linear rate of around 10,000 f.p.m., and at a weight rate of about 17 lbs./min. of air on the basis of a feed of 5 lbs./min. of ore. This gave a saturation ratio (R) of 0.29. "R" is the ratio of weight of feed/weight of air.

Under the conditions obtaining in the system, the manometer reading in conduit 1 in advance of the pressure face 26 was about 6.25 inches of water, while on the primary collector side of the pressure face 26, the manometer reading was 0.25 inch of water.

Similar measurements made in the proximity of the pressure face 30 formed within the T 13, showed manometer reading in the conduit 12 of 8.23 inches of water, a linear flow of 11,840 f.p.m., and a weight rate of flow of about 20 lbs./min. of air. At this point, R equalled about .13. On the secondary collector side of the pressure face 30, the manometer reading was $11/16$ inch of water.

At the end of the run of 100 lbs. of ore, the following data were found:

*Primary fraction*

47.6 lbs. total weight of powder
Assay, 37.7% Fe

This entire fraction was then subjected to a single screening operation, using a 150-mesh screen, with the following results:

+150 m. sub-fraction, 33 lbs., which was made up largely of silica and unliberated iron, suitable for recirculation through the system.
−150 m. sub-fraction, 10 lbs., which analyzed 60% Fe, or higher, and represents an upgraded fraction suitable (after pelletizing) for conversion into metallic iron.

*Secondary fraction*

23 lbs. total weight of powder
Assay, 24.0% Fe

This entire fraction was then subjected to a single screening operation, using a 200-mesh screen with the following results:

+200 m. sub-fraction, 15 lbs., which was considered tails and sent to discard.
−200 m. sub-fraction, 8 lbs., which analyzed about 65% Fe and represents an upgraded fraction suitable for combining with the 10 lbs. (−150 m. sub-fraction of the primary fraction) for conversion into metallic iron.

*Tails*

(Collected beyond blower 20)
30 lbs. total weight of powder
Assay, 25.8% Fe

The overall yield based upon the totals of the sub-fractions of 10 lbs. and 8 lbs. amounting to 18 lbs. and assaying better than 60% Fe represented a recovery of 10 lbs. of iron metal (calculated), or about 40% of the iron metal (calculated) in the starting material.

I claim as my invention:

1. In a method for the upgrading of the iron content of an iron ore of dry discrete particles of various sizes and densities, the steps of:
 providing a gas-suspendable feed mixture of discrete particles of such iron ore of a particle size generally less than 48 mesh, inducing a flow in opposite directions along a common horizontal axis of two confined streams of gas by a suction force acting upon the streams so induced to withdraw a third stream of gas therefrom through a confined path substantially at right angles to said axis,
 thereby setting up at the confluence of said first and second streams a face of resistance,
 feeding said mixture of discrete particles into one of said two streams at a point remote from said confluence to suspend said particles in said one stream,
 collecting as a primary fraction that portion of said mixture that passes from said one stream through said face of resistance into said second stream,
 collecting as a secondary fraction that portion of said mixture carried by said third stream,
 screening said primary and secondary fractions and retaining sub-fractions each of less than about 150-mesh and each of higher iron content than that of said feed mixture, and
 combining said retained sub-sections to recover an upgraded iron ore.

2. In a method as defined by claim 1, wherein said screening of said secondary fraction is a single screening operation using a 200-mesh screen and the sub-fraction retained is that which passes through the 200-mesh screen.

3. In a method as defined by claim 1, wherein, a second face of resistance is set up by said suction force in said third stream, and the secondary fraction collected comprises those discrete particles that pass through said second face of resistance.

4. In a method for the separation into fractions of a gas-suspendable mixture of discrete particles of varying shapes, sizes and densities, the steps which comprise:
 establishing a source of suction to set up the following confined paths of gas flow:
  first and second open-ended flow paths having a common horizontal axis for flow of a first and second stream of gas in opposite directions to a point of confluence,
  a third open-ended flow path at right angles to said axis and leading from said point of confluence,
  a fourth flow path at right angles to said third path leading to said suction source to thereby set up in said third path a second point of confluence between gas streams from said first point of confluence and from the open end of said third path,
 feeding said mixture of discrete particles into said first path for gas suspension therein,
 collecting as a primary fraction the particles passing beyond said first point of confluence into said second path,
 collecting as a secondary fraction the particles passing beyond said second point of confluence toward the open end of said third path,
 screening said primary and secondary fractions separately,
 collecting selected sub-fractions of said screened primary and secondary fractions respectively, and
 combining and recovering said collected sub-fractions.

References Cited by the Examiner

UNITED STATES PATENTS

| | | | |
|---|---|---|---|
| 773,180 | 10/1904 | Anderson | 209—137 |
| 1,029,532 | 6/1912 | Day | 209—137 |
| 2,681,477 | 6/1954 | Van Doorn | 209—137 |
| 2,849,113 | 8/1958 | Bourne | 209—12 |

FRANK W. LUTTER, *Primary Examiner.*